June 18, 1974 G. C. ECKERBOM ET AL 3,817,788
BI-POLAR ELECTRODE FOR LEAD-ACID-TYPE ACCUMULATOR
Filed Jan. 4, 1972
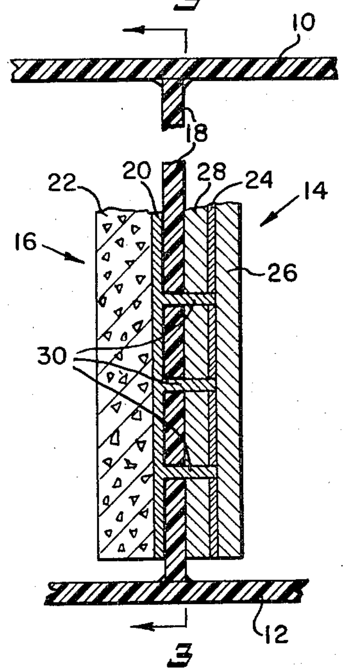
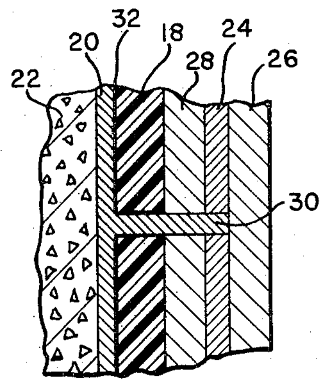
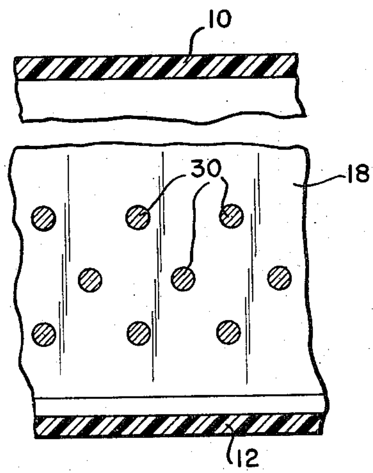
Fig. 3

United States Patent Office 3,817,788

Patented June 18, 1974

3,817,788

BI-POLAR ELECTRODE FOR LEAD-ACID-TYPE ACCUMULATOR

Gunnar C. Eckerbom and Karl T. Rehnberg, Goteborg, Sweden, assignors to Aktiebolaget Tudor, Stockholm, Sweden Filed Jan. 4, 1972, Ser. No. 215,384
Int. Cl. H01m *39/06*
U.S. Cl. 136—10 3 Claims

ABSTRACT OF THE DISCLOSURE

In lead-acid accumulators, a bi-polar electrode which has a support wall of insulating material and two current conductors of large surface areas on opposite sides of the support wall. The two current conductors are connected electrically together by a large number of through connectors which tend to keep the current density throughout the current conductors substantially uniform. Negative active material is on one current conductor and positive active material is on the other current conductor. The electrode is so constructed as to prevent leakage between electrolyte in contact with the negative active material and electrolyte in contact with the positive active material.

This invention relates to lead-acid accumulators, and more particularly to a bi-polar electrode construction where the negative electrode of one cell is physically constructed to be part of a cell wall and the positive electrode of an adjacent cell.

In lead-acid accumulators with bi-polar electrodes, a problem of producing a liquid-tight seal between the adjacent cells occurs which has not hitherto been solved in a satisfactory manner.

The present invention therefore is intended to obviate this problem and is especially directed to a bi-polar electrode for a lead-acid accumulator, which is principally characterized in that the supporting part of the electrode is formed by an insulator.

Many different solutions have been proposed for the sealing problem. Basically, the problem deals with seals between the casing and the two electrodes, which are in different cells. At the same time, it is essential to have a liquid-tight seal between each terminal of the cell. The terminals may be the conductive layers in each electrode in two adjacent cells, and it is essential not to have electrically conductive contact via the electrolyte.

Hitherto known bi-polar electrodes have been made of a liquid-tight metal sheet (a lead plate, in the case of lead-acid accumulators) which is covered on one side with negative active material and on the other side with positive active material. The outer edges of the metal sheet were preferably left uncovered and were fixed in a liquid-tight manner in the walls and cover of the battery casing. In accordance with another known type of construction, an insulating sealing element in the form of a frame placed between the metal plates has been used.The battery consisted of a number of these elements which each had electrodes and sealed end plates, joined and held together under pressure or by means of bolts or the like constructional elements. This kind of sealing arrangement has not, however, been found to be dependable in operation.

In order to be able to guarantee that the bi-polar battery works in practical applications, without accidents, it is necessary to prevent leakage of the electrolyte from cell to cell.

It is therefore an object of the invention to provide a novel bi-polar electrode in which a liquid-tight connection is facilitated and obtained with the utmost possible certainty.

Another object is to provide an improved bi-polar electrode on a supporting wall of insulating material and which is joined in a liquid-tight manner by welding or bonding to the walls of the cell or battery casing. As a further feature, the insulating material of the supporting wall is preferably the same as is used in the other walls of the cell or battery casing.

These and other objects of the invention will become more fully apparent from the claims and from the description as it proceeds in connection with the appended drawings wherein:

FIG. 1 is a plan view in section showing a portion of an electrode in accord with the present invention;

FIG. 2 shows part of the electrode of FIG. 1 to an enlarged scale; and

FIG. 3 is an end elevation in section taken along line 3—3 of FIG. 1.

Referring now to the drawings, the battery casing has side walls 10 and 12 which are shown as being part of two cells 14, 16. In a lead-acid accumulator, it is important that the liquid electrolyte in cell 14 is kept separate from the electrolyte in cell 16 by a common wall 18 also of insulating material.

In FIGS. 1 and 2, the negative electrode is shown to be in cell 16 and the positive electrode in cell 14. The negative electrode comprises a metallic current conductor 20 which may be a plate or grid of metal that is preferably substantially coextensive with the area of the common wall 18. The negative active material 22 is in the form of a continuous layer on only one side of conductor 20 and has a surface exposed to the electrolyte in cell 16.

The positive electrode in cell 14 comprises a metallic current conductor 24 which may be a plate or open grid of metal that is preferably substantially coextensive with the area of the common wall 18. The positive active material is shown to comprise two layers 26 and 28 that are on opposite sides of conductor 24. Layer 28 is in contact with both common wall 18 and conductor 24 while one surface of layer 26 is exposed to the electrolyte in cell 14.

During operation of the battery, the chemical changes of the negative active material 22 must take place in one direction only reckoned from the current conductor 20. The chemical changes of the positive active material in layers 26 and 28 take place in both directions from the current conductor 24.

The two current conductors 20 and 24 are connected together electrically by means of a large number of through conductors 30. As shown in FIG. 3, the through conductors are distributed throughout the surface areas of the two electrodes so that the current density can be maintained as nearly as possible uniform throughout the entire area of the electrodes.

It is necessary, in the case of batteries having liquid electrolyte, that the through conductors 30 be well sealed in common wall 18. For lead-acid accumulators, it has been found that a lead sulfate layer 32 (see heavy lines in FIG. 2), which forms on the surface of conductor 20, forms in itself an effective seal. The positive active material in layer 28 applied against the insulating material in wall 18 also constitutes a fully effective seal against electrolyte leakage in connection with through conductors 30. To reduce the likelihood of the sulfate layer becoming brittle, it is advantageous for the positive active material to be mixed with an additive such as glycerine.

From the foregoing, it is apparent that the negative current conductor 20 is applied directly on one surface of wall 18 of the insulating material. On the other surface of wall 18, a layer 28 of positive active material is applied between that surface and the positive current conductor 24. On the outside surface of conductor 24, another layer 26 of positive active material is provided. Wall 18, which serves as the supporting insulating member for the bi-polar electrode assembly, may thereafter be placed in a battery casing with the edges sealed with a liquid-tight weld or bonding agent. Making wall 18 out of the same insulating material as is used for the battery casing walls 10 and 12 is particularly advantageous.

The negative current conductor 20 is connected with a positive current conductor 24 on the other side of the wall 18 of the insulating material. It is important that the positive conductor, however, is not applied against the insulating wall 18 without a small space or distance existing between these two, so that when the electrode is finished, the negative active material 22 is located only on one side of its conductive member 20, while on the positive terminal, the active material is located on two layers 26 and 28 that are on both sides of the positive conductive member 24.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. In a lead-acid accumulator having a plurality of cells each having a liquid electrolyte, a bi-polar electrode comprising:

a support wall of insulating material;

positive and negative metallic current conductor means on opposite sides of said wall and having areas which are substantially coextensive with each other and extend over a substantial area of said wall;

a plurality of feed through current conductor elements which electrically connect said conductor means together;

the negative current conductor means being tight against one surface of the support wall and having negative active material on an exposed side of said negative current conductor means, the positive current conductor means being spaced at a distance from the adjacent surface of said support wall and having positive active material on both sides of the positive current conductor means; and wherein lead sulfate on said negative metallic current conductor means and on said feed through circuit elements forms a liquid-tight support wall.

2. The accumulator as claimed in claim 1 wherein the feed through conductor elements are disposed throughout the area of the electrode in a pattern to provide a substantially uniform current density in said current conductor means.

3. The accumulator as claimed in claim 2 wherein the positive active material tightly fills the space between the positive current conductor means and said support wall and forms a liquid-tight seal around said feed through conductor elements.

References Cited

UNITED STATES PATENTS

| | | | |
|---|---|---|---|
| 553,596 | 1/1896 | Ribbe | 136—12 |
| 3,589,943 | 6/1971 | Grubb et al. | 136—134 P |
| 3,003,013 | 10/1961 | Duddy | 136—10 |
| 3,553,019 | 1/1971 | Bushrod et al. | 136—6 A |
| 2,942,053 | 6/1960 | Baldwin, Jr. et al. | 136—6 C |
| 1,712,897 | 5/1929 | Morrison | 136—12 |
| 3,353,999 | 11/1967 | Osborn | 136—26 |
| 3,635,766 | 1/1972 | Quisling | 136—100 |
| 3,167,456 | 1/1965 | Schilke et al. | 136—10 |
| 3,170,820 | 2/1965 | Drengler et al. | 136—10 |
| 3,003,012 | 10/1961 | Duddy | 136—10 |
| 3,390,014 | 6/1968 | Eisler | 136—10 |
| 3,484,290 | 12/1969 | Knight | 136—10 |

ALLEN B. CURTIS, Primary Examiner

C. F. LE FEVOUR, Assistant Examiner

U.S. Cl. X.R.

136—12, 26